United States Patent
Jiang

(10) Patent No.: US 8,073,012 B2
(45) Date of Patent: Dec. 6, 2011

(54) METHOD AND RELATED APPARATUS FOR HANDLING PACKET DISCARD IN A WIRELESS COMMUNICATIONS SYSTEM

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 384 days.

(21) Appl. No.: 12/111,969

(22) Filed: Apr. 30, 2008

(65) Prior Publication Data

US 2008/0273551 A1    Nov. 6, 2008

Related U.S. Application Data

(60) Provisional application No. 60/915,670, filed on May 2, 2007.

(51) Int. Cl.
*H04J 3/00* (2006.01)
(52) U.S. Cl. .......................................... 370/476
(58) Field of Classification Search .................. 370/229, 370/230, 231, 235, 351, 389, 412, 415, 416, 370/464, 465, 466, 473, 474, 476
See application file for complete search history.

(56) References Cited

U.S. PATENT DOCUMENTS

| | | | | |
|---|---|---|---|---|
| 6,621,796 | B1 * | 9/2003 | Miklos | 370/236 |
| 2002/0089984 | A1 * | 7/2002 | Jiang | 370/394 |
| 2004/0033801 | A1 * | 2/2004 | Yi et al. | 455/428 |
| 2006/0077892 | A1 | 4/2006 | Jiang | |
| 2006/0259844 | A1 | 11/2006 | Kawada | |

FOREIGN PATENT DOCUMENTS

| | | |
|---|---|---|
| CN | 1753408 A | 3/2006 |
| EP | 1 333 609 A1 | 8/2003 |
| JP | 2000134259 | 5/2000 |
| JP | 2003249974 A | 9/2003 |
| JP | 2006094518 A | 4/2006 |
| KR | 19990050419 | 7/1999 |

(Continued)

OTHER PUBLICATIONS

Ericsson: "L2 enhancements: draft CR to RLC", 3GPP TSG-RAN2 Meeting #56bis, R2-070034, Jan. 15-19, 2007, paragraphs [06.1], [08.2], [9.2.2.7]-[9.2.2.8], [9.7.3.3], [11.6]-[11.6.3.1], XP050133149, Sorrento, Italy.

(Continued)

*Primary Examiner* — Kwang B Yao
*Assistant Examiner* — Obaidul Huq
(74) *Attorney, Agent, or Firm* — Klein, O'Neil & Singh, LLP

(57) ABSTRACT

A method for handling packet discard in a transmitter of a wireless communications system includes activating a "use of a special value of a header extension field" mode, discarding a plurality of service data units, wherein the last service data unit of the plurality of service data units ends at an end of a first protocol data unit using the special value in a header extension field, and setting a value of a field to be a sequence number of a second protocol data unit, wherein the field is utilized for indicating a receiver to discard all not yet successfully received service data units that have segments with sequence number being less than the value of the field, and the second protocol data unit is next to the first protocol data unit.

10 Claims, 4 Drawing Sheets

FOREIGN PATENT DOCUMENTS

| KR | 20010080344 | 8/2001 |
| KR | 1020060117212 | 11/2006 |

OTHER PUBLICATIONS

Pawel Matusz: "On Efficiency of Layer 2 of the Radio Interface Protocol Stack in UMTS", Jan. 1, 2006, abstract plus pp. i to viii plus pp. 90 to 103 plus pp. 152 to 155, XP002470776, Retrieved from the internet: URL: http://www.3g4g.co.uk/Tutorial/Resources/Matusz_PhD_Thesis_076.pdf.

3GPP TS 25.322 V7.2.0 (Sep. 2006) Radio Link Control (RLC) Protocol Specification (Release 7).

R2-071195, "RLC optimization for Improved L2", Ericsson, Nokia and Samsung, 3GPP TSG-RAN WG2#57bis, Malta, Mar. 26-30, 2007.

3gpp, Offline private group email discussion, Janne Peisa (JO/LMF) [janne.peisa@ericsson.com], Ericsson, May 7, 2007.

Office Action on corresponding JP patent application No. 2008-120116 dated Nov. 30, 2010.

Final Office Acton on coresponding JP patent application No. 2008120116 dated May 17, 2011.

* cited by examiner

METHOD AND RELATED APPARATUS FOR HANDLING PACKET DISCARD IN A WIRELESS COMMUNICATIONS SYSTEM

CROSS REFERENCE TO RELATED APPLICATIONS

This application claims the benefit of U.S. Provisional Application No. 60/915,670, filed on Feb. 5, 2007 and entitled "SDU discard for PDU with implicit Length Indicator", the contents of which are incorporated herein by reference.

BACKGROUND OF THE INVENTION

1. Field of the Invention

The present invention relates to a method and apparatus for handling packet discard in a wireless communications system, and more particularly, to a method and apparatus for preventing stall of a receiving window and enhancing transmission efficiency in the wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

The access stratum of the 3G mobile telecommunications system comprises a radio resource control (RRC), radio link control (RLC), media access control (MAC), packet data convergence protocol (PDCP), broadcast/multicast control (BMC) and other sub-layers of different functions. The operations of the above-mentioned sub-layers are well known for those skilled in the art, and will not be further mentioned. A primary function of the RLC layer is providing different transmission quality processing, performing segmentation, reassembly, concatenation, padding, retransmission, sequence check, and duplication detection on transmitted data or control instructions based on different transmission quality requirements. The MAC layer can match packets received from different logic channels of the RLC layer to common, shared, or dedicated transport channels according to radio resource allocation commands of the RRC layer, for performing channel mapping, multiplexing, transport format selection, or random access control.

When the RLC layer operates in an acknowledged mode (AM), a header of an RLC PDU (Protocol Data Unit) comprises a two-bit HE (Header Extension) field utilized for indicating if the next octet is data or a Length Indicator (LI) and Extension (E) bit. The HE field has different values, and the corresponding description is as follows:

1. "00": The succeeding octet contains data.
2. "01": The succeeding octet contains LI and E bit.
3. "10" and "11": Reserved. PDUs with this coding represents that a protocol error is occurred, and the PDUs will be discarded.

In order to decrease overhead, the prior art can trigger a "use of the special value of the HE field" mode to set "10" of the HE field to indicate that the succeeding octet contains data and the last octet of the corresponding PDU is the last octet of an SDU (Service Data Unit). In other words, if an SDU ends at the end of a PDU, the HE field of the PDU will be set to "10." As a result, an extra PDU carrying the corresponding LI is not needed, to decrease overhead.

In some situations, such as transmission timeout or over maximum allowed times of retransmission, the transmitter can trigger an SDU discard with explicit signalling procedure, and uses an MRW SUFI (Move Receiving Window Super Field) in a STATUS PDU to request the receiver to move its receiving window to discard specified SDUs. After the SDU discard with explicit signalling procedure is triggered, the transmitter discards all SDUs to be discarded, and discards PDUs including segments of the discarded SDUs or LIs indicating the end of the SDUs. Then, the transmitter sends the MRW SUFI to inform the receiver about discarding the SDUs, so as to complete the SDU discard with explicit signalling procedure.

As mentioned above, in the "use of the special value of the HE field" mode, if an SDU ends at the end of a PDU, the extra PDU carrying the corresponding LI is not needed. In such a situation, the method of setting the contents of MRW SUFI needs to be modified, so as to support the "use of the special value of the HE field" mode.

Detail description of the MRW SUFI can be found in the related protocol specification. The MRW SUFI comprises fields of:

1. LENGTH: The number of discarded SDU.
2. $SN\_MRW_i$: Each $SN\_MRW$ is used to indicate the end of each discarded SDU. The last $SN\_MRW$, i.e. $SN\_MRW_{LENGTH}$ requests the receiver to discard all not yet successfully received SDUs that have segments or LIs indicating end of the SDUs in the PDUs with Sequence Numbers $<SN\_MRW_{LENGTH}$.
3. $N_{LENGTH}$: $N_{LENGTH}$ is used together with $SN\_MRW_{LENGTH}$ to indicate the end of the last SDU to be discarded in the receiver.

To support the "use of the special value of the HE field" mode, the prior art provides operations for setting the MRW SUFI as follows. If the "use of the special value of the HE field" mode is triggered, and the last SDU to be discarded ends at the end of a PDU, i.e. the PDU does not contain an LI corresponding to the last SDU to be discarded, then the prior art sets the $SN\_MRW_{LENGTH}$ to be a sequence number (SN) "a" of the PDU, and sets $N_{LENGTH}$ to be "0000." Thus, the receiver will advance its receiving window to start from SN=a. However, as mentioned above, after the SDU discard with explicit signalling procedure is triggered, the transmitter discards all SDUs to be discarded, and discards PDUs including segments of the discarded SDUs or LIs indicating the end of the SDUs. In other words, PDU with SN=a has been discarded by the transmitter in this example, and will not be transmitted to the receiver. In such a situation, the receiver waits for the PDU with SN=a, so that the receiving window is stalled until another MRW procedure is triggered. The transmission efficiency and transport data rate are reduced.

In short, when the "use of the special value of the HE field" mode is triggered, and the last SDU to be discarded ends at the end of a PDU, the prior art sets $SN\_MRW_{LENGTH}$ to SN of the PDU, to advance the receiving window of the receiver to start from the SN of the PDU. However, since the PDU has been discarded by the transmitter, the receiver cannot receive the PDU anymore, causing stall of the receiving window and degradation of transmission efficiency.

SUMMARY OF THE INVENTION

According to the claimed invention, a method for handling packet discard in a transmitter of a wireless communications system. The wireless communications system comprises the transmitter and a receiver. The method comprises activating a "use of a special value of a header extension field" mode representing that a field following a header extension field of the special value in a protocol data unit comprises data, and a last octet of the protocol data unit is a last octet of a service data unit, discarding a plurality of service data units, wherein the last service data unit of the plurality of service data units ends at an end of a first protocol data unit using the special value in a header extension field, and setting a value of a field to be a sequence number of a second protocol data unit, wherein the field is utilized for indicating the receiver to discard all not yet successfully received service data units that have segments with sequence number being less than the value of the field, and the second protocol data unit is next to the first protocol data unit.

According to the claimed invention, a communications device for handling packet discard in a wireless communications system. The wireless communications system comprises the communications device and a receiver device. The communications device comprises a control circuit for realizing functions of the communications device, a processor installed in the control circuit, for executing a program code to command the control circuit, and a memory installed in the control circuit and coupled to the processor for storing the program code. The program code comprises activating a "use of a special value of a header extension field" mode representing that a field following a header extension field of the special value in a protocol data unit comprises data, and a last octet of the protocol data unit is a last octet of a service data unit, discarding a plurality of service data units, wherein the last service data unit of the plurality of service data units ends at an end of a first protocol data unit using the special value in a header extension field, and setting a value of a field to be a sequence number of a second protocol data unit, wherein the field is utilized for indicating the receiver device to discard all not yet successfully received service data units that have segments with sequence number being less than the value of the field, and the second protocol data unit is next to the first protocol data unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
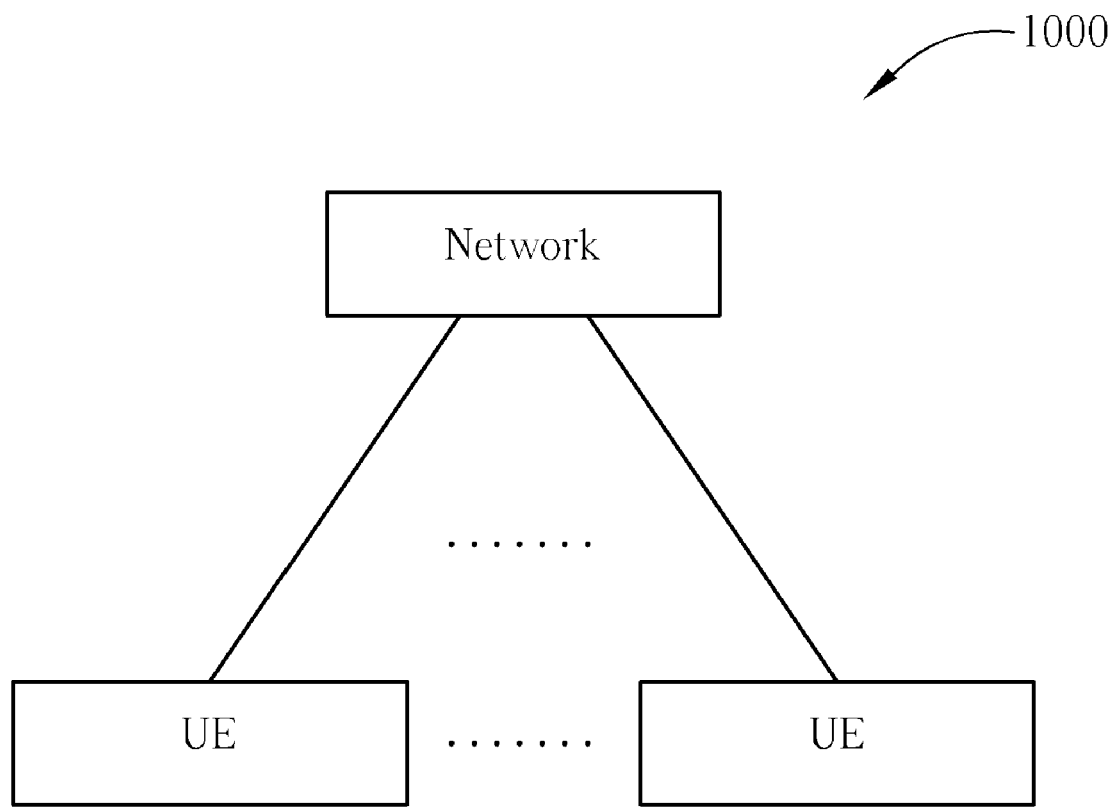
FIG. 1 is a schematic diagram of a wireless communications system.

Please refer to FIG. 1, which illustrates a schematic diagram of a wireless communications system 1000. The wireless communications system 1000 can be a 3G mobile telecommunications system, an LTE (long-term evolution) system or other mobile communications systems, and is briefly composed of a network and a plurality of UEs. In FIG. 1, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
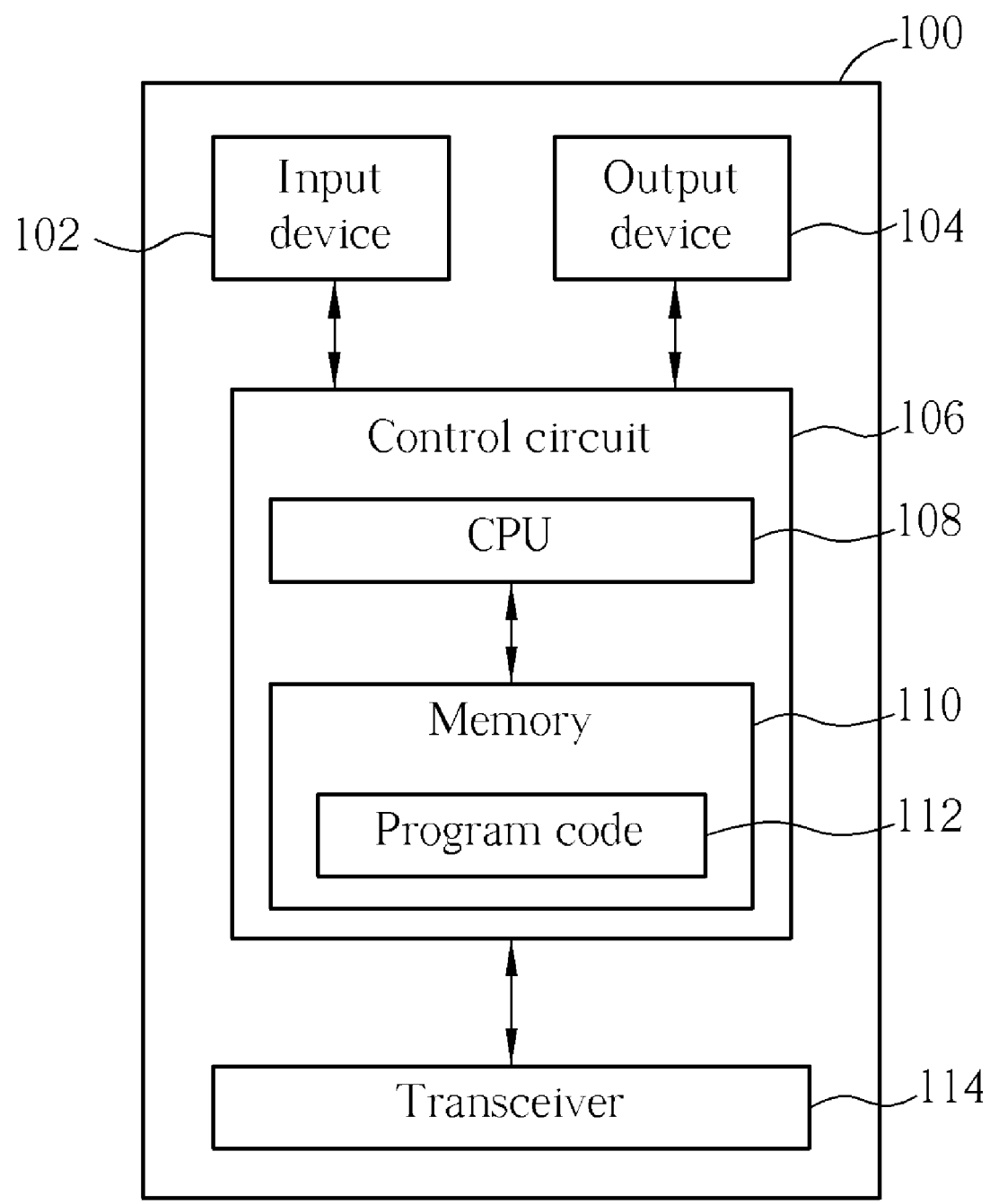
FIG. 2 is a function block diagram of a wireless communications device.

Please refer to FIG. 2, which is a functional block diagram of a communications device 100. The communications device 100 is utilized for realizing the network or the UEs. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
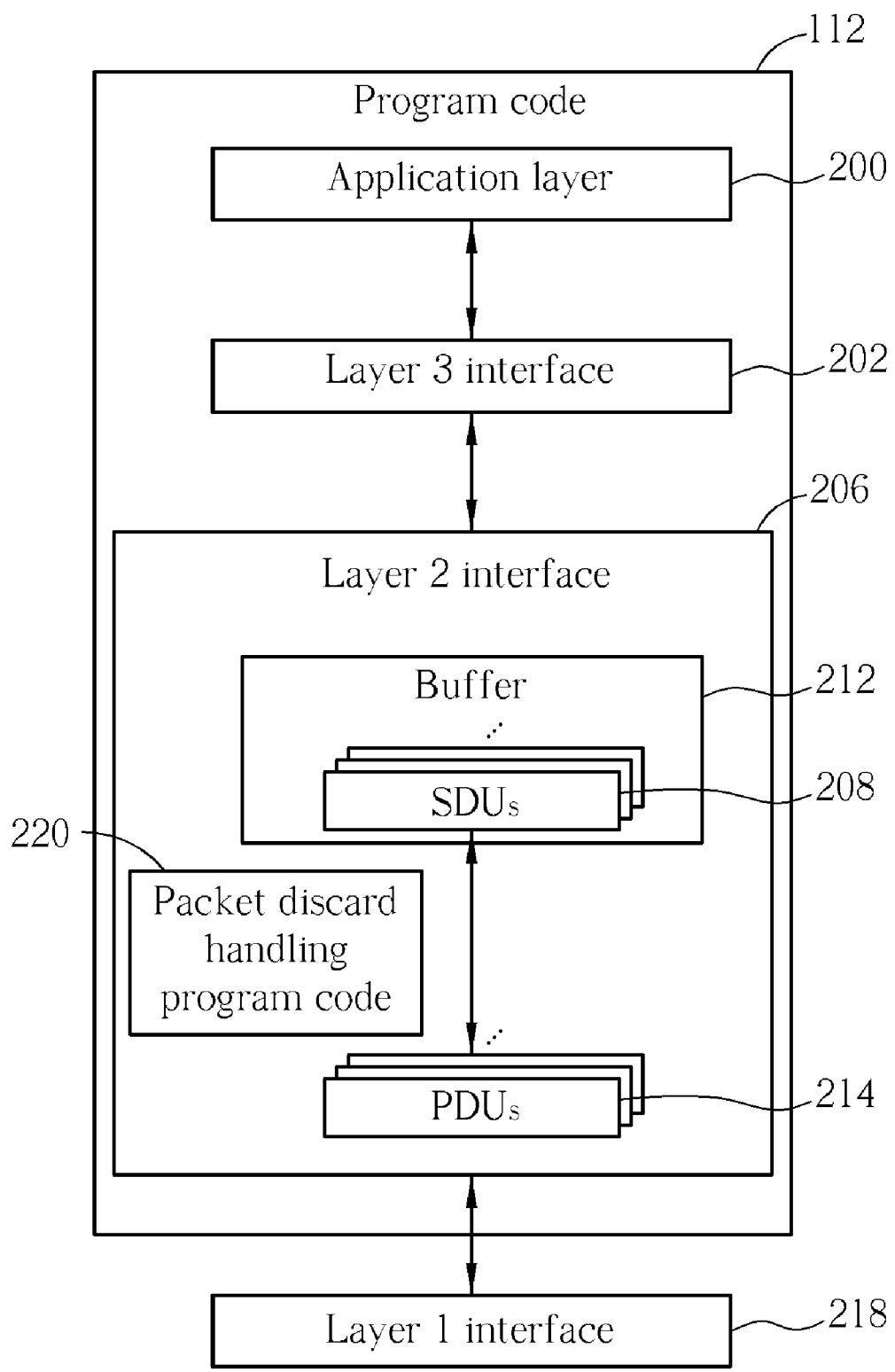
FIG. 3 is a diagram of program code of FIG. 2.

Please continue to refer to FIG. 3. FIG. 3 is a diagram of the program code 112 shown in FIG. 2. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

When the communications device 100 operates in AM, a header of a PDU 214 comprises a two-bit HE field utilized for indicating if the next octet is data or an LI and E bit. When the "use of the special value of the HE field" mode is triggered, a reserved value of the HE field represents that the succeeding octet contains data and the last octet of the corresponding PDU is the last octet of an SDU. In such a situation, the embodiment of the present invention provides a packet discard handling program code 220, for accurately handling packet discard in the "use of the special value of the HE field" mode.

Figure 4:
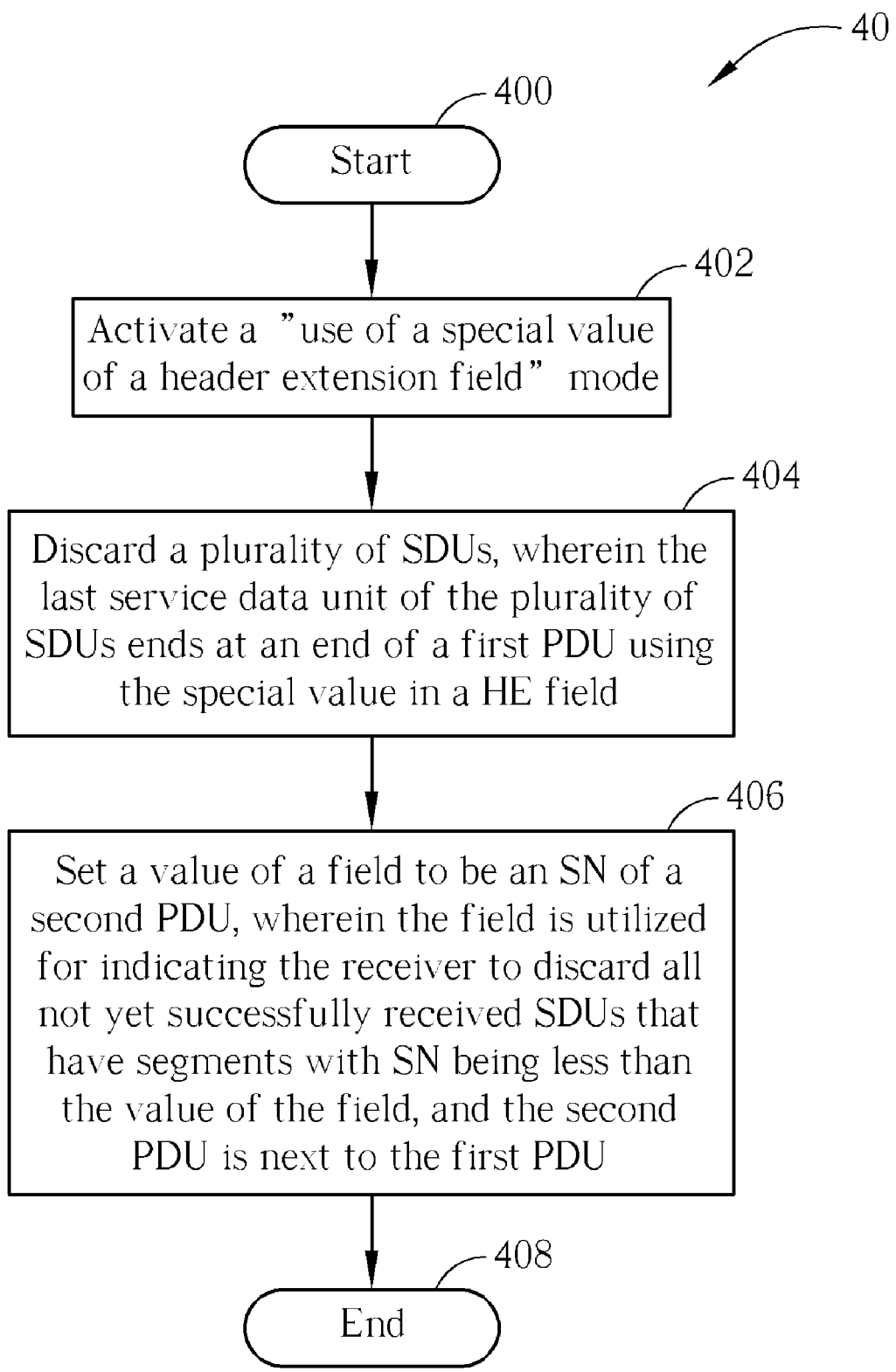
FIG. 4 is a flowchart of a process according to an embodiment of the present invention.

Please refer to FIG. 4, which illustrates a schematic diagram of a process 40 in accordance with an embodiment of the present invention. The process 40 is utilized for handling packet discard in a transmitter of the wireless communications system 1000. The wireless communications system 1000 comprises the transmitter and a receiver. The transmitter can be the network or the UE. The process 40 can be compiled into the packet discard handling program code 220, and comprises the following steps:

Step 400: Start.
Step 402: Activate a "use of a special value of a header extension field" mode.
Step 404: Discard a plurality of SDUs, wherein the last service data unit of the plurality of SDUs ends at an end of a first PDU using the special value in a HE field.

Step 406: Set a value of a field to be an SN of a second PDU, wherein the field is utilized for indicating the receiver to discard all not yet successfully received SDUs that have segments with SN being less than the value of the field, and the second PDU is next to the first PDU.

Step 408: End.

According to the process 40, when the "use of a special value of a header extension field" mode is triggered, if a first PDU uses the special value in its HE field to indicate that the last discarded SDU ends at the end of the first PDU, the embodiment of the present invention set the last MRW SN field, i.e. $SN\_MRW_{LENGTH}$, to be an SN of a second PDU, which is next to the first PDU. Note that the plurality of SDUs can contain only one SDU.

In short, if the "use of a special value of a header extension field" mode is triggered, and the last SDU to be discarded ends at the end of a PDU, i.e. the PDU does not contain an LI corresponding to the last SDU to be discarded, then the embodiment of the present invention sets $SN\_MRW_{LENGTH}$ to be the SN of the next PDU. For example, if SN of the PDU=a, the embodiment of the present invention sets $SN\_MRW_{LENGTH}$=(a+1). As a result, after the transmitter sends a STATUS PDU with $SN\_MRW_{LENGTH}$=(a+1) to the receiver, the receiver advances its receiving window to start from SN=(a+1), so as to prevent stall of the receiving window and enhance transmission efficiency accordingly.

When the "use of a special value of a header extension field" mode is triggered, and the last SDU to be discarded ends at the end of a PDU, the prior art sets $SN\_MRW_{LENGTH}$ to be SN of the PDU. However, since the PDU has been discarded by the transmitter, the receiver cannot receive the PDU anymore, causing stall of the receiving window and degradation of transmission efficiency. In comparison, when the "use of a special value of a header extension field" mode is triggered, and the last SDU to be discarded ends at the end of a PDU, the embodiment of the present invention sets $SN\_MRW_{LENGTH}$ to be SN of the next PDU. Since the next PDU is not discarded by the transmitter, the receiver can receive the next PDU and advance its receiving window accordingly, so as to prevent transmission delay.

In summary, when the "use of a special value of a header extension field" mode is triggered, and the last SDU to be discarded ends at the end of a PDU, the embodiment of the present invention sets $SN\_MRW_{LENGTH}$ to be SN of the next PDU. Therefore, the embodiment of the present invention can prevent stall of the receiving window, and enhance transmission efficiency accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling, service data unit, called SDU hereinafter, discard in a transmitter of a wireless communications system, the wireless communications system comprising the transmitter and a receiver, the method comprising:
   activating a mode of "use of a special value of a header extension field", wherein the mode represents that, in a protocol data unit, called PDU hereinafter, a header extension field with a special value indicates both that a succeeding octet following the header extension field contains data and that a last octet of the PDU is a last octet of a SDU;
   forming a first PDU, wherein the first PDU contains a last SDU and a header extension field with the special value in the first PDU is used instead of a length indicator for indicating that the last octet of the last SDU is the last octet of the first PDU and that the succeeding octet following the header extension field contains data;
   discarding a plurality of SDUs including the last SDU; and
   setting a value of a field to be a sequence number of a second PDU, wherein the field is utilized for indicating the receiver to discard all not yet successfully received SDUs that have segments with sequence number being less than the value of the field, and the second PDU is next to the first PDU.

2. The method of claim 1, wherein the field is a Move Receiving Window Sequence Number field.

3. The method of claim 1, wherein the field is carried in a STATUS PDU.

4. The method of claim 3, further comprising outputting the STATUS PDU to the receiver.

5. The method of claim 1, wherein the plurality of SDUs contains only one SDU.

6. A communications device for handling, service data unit, called SDU hereinafter, discard in a wireless communications system, the wireless communications system comprising the communications device and a receiver device, the communications device comprising:
   a control circuit for realizing functions of the communications device;
   a processor installed in the control circuit, for executing a program code to command the control circuit; and
   a memory installed in the control circuit and coupled to the processor for storing the program code;
   wherein the program code comprises:
      activating a mode of "use of a special value of a header extension field", wherein the mode represents that, in a protocol data unit, called PDU hereinafter, a header extension field with a special value indicates both that a succeeding octet following the header extension field contains data and that a last octet of the PDU is a last octet of a SDU;
      forming a first PDU, wherein the first PDU contains a last SDU and a header extension field with the special value in the first PDU is used instead of a length indicator for indicating that the last octet of the last SDU is the last octet of the first PDU and that the succeeding octet following the header extension field contains data;
      discarding a plurality of SDUs including the last SDU; and
      setting a value of a field to be a sequence number of a second PDU, wherein the field is utilized for indicating the receiver to discard all not yet successfully received SDUs that have segments with sequence number being less than the value of the field, and the second PDU is next to the first PDU.

7. The communications device of claim 6, wherein the field is a Move Receiving Window Sequence Number field.

8. The communications device of claim 6, wherein the field is carried in a STATUS PDU.

9. The communications device of claim 8, wherein the program code further comprises outputting the STATUS PDU to the receiver device.

10. The communications device of claim 6, wherein the plurality of SDUs contains only one SDU.

* * * * *